March 18, 1941.   R. W. KENYON   2,235,432
CARPET SWEEPER
Filed Jan. 11, 1938    2 Sheets-Sheet 1
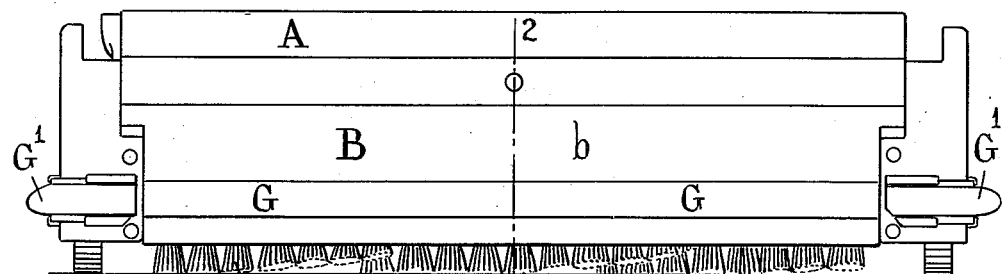
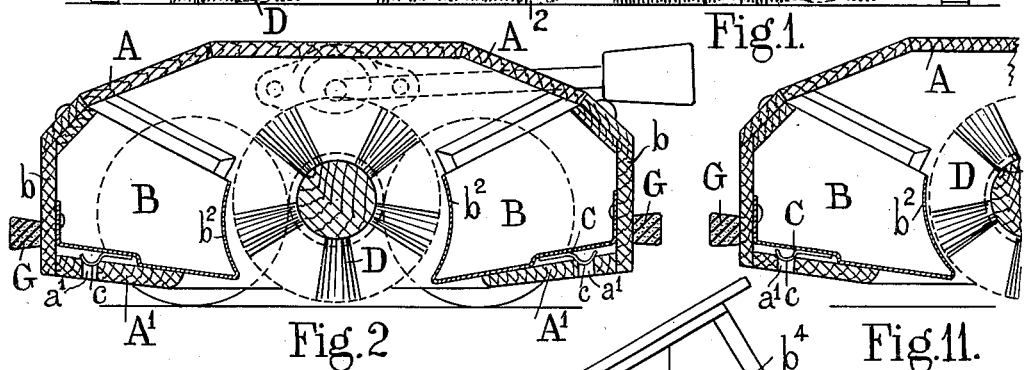
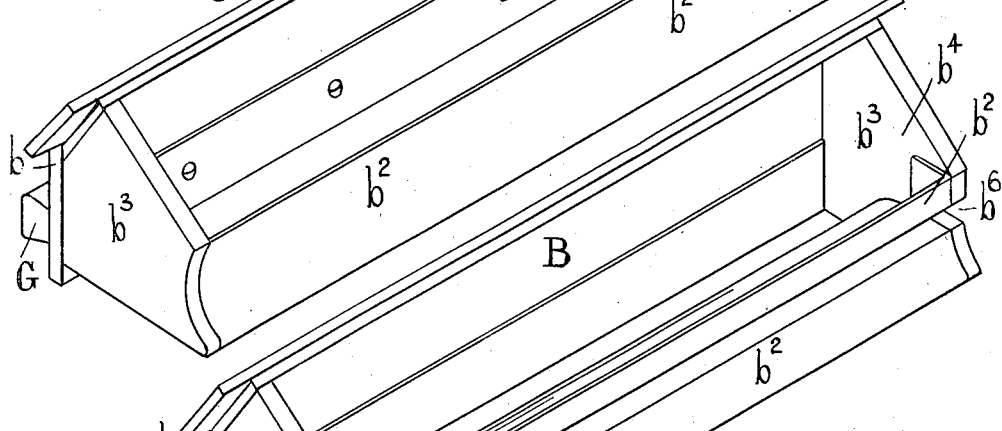
INVENTOR
R. W. Kenyon March 18, 1941.  R. W. KENYON  2,235,432
CARPET SWEEPER
Filed Jan. 11, 1938    2 Sheets-Sheet 2

INVENTOR
R. W. Kenyon

Patented Mar. 18, 1941

2,235,432

UNITED STATES PATENT OFFICE 2,235,432

CARPET SWEEPER

Richard Walton Kenyon, Accrington, England, assignor to Entwisle & Kenyon Limited, Accrington, England Application January 11, 1938, Serial No. 184,410
In Great Britain October 28, 1937

1 Claim. (Cl. 15—41)

This invention relates to carpet sweepers having a pan or receptacle on each side of a central brush to receive the dust and litter swept up by the latter and more particularly to improvements in such carpet sweepers of the kind in which the dust receptacles are removed horizontally or substantially horizontally through the sides of the sweeper casing for the discharge of the dust and other litter collected therein instead of being mounted, in the more usual way, on pivots near the brush about which they can be pivoted.

Each horizontally or substantially horizontally removable dust receptacle is provided with a curved inner wall, the curvature of which is such that the wall will be either concentric or approximately concentric with the brush when the receptacle is in its normal position or will form a hopper like path for the dust and litter between it and the brush, the lower edge of the wall being spaced further from the brush than the upper edge, when the receptacle is in its normal position.

The upper edge of the inner wall preferably is in contact or almost in contact with the periphery of the brush.

The two ends of the receptacle may be closed in which case the dust and litter is discharged therefrom through the opening by which it enters or one or both ends may be open to enable the dust and litter to be discharged through an end by moving the receptacle into a vertical or substantially vertical position after removal from the sweeper casing. The latter construction is advantageous when the aperture through which the dust and litter enters the receptacle is of less width than the width of the receptacle.

The invention will be described with reference to the accompanying drawings in which:

Fig. 1 is a side elevation of a carpet sweeper having a dust receptacle formed in accordance with the invention applied thereto.

Fig. 2 is a transverse section on line 2—2 Fig. 1.

Fig. 3 is a perspective view of one of the dust receptacles shown in Figs. 1 and 2 for use in a carpet sweeper having each traction wheel carried by an independent stub axle.

Fig. 4 is a perspective view of a modified form of the dust receptacle constructed for use in a carpet sweeper having each pair of traction wheels at either side of the brush carried at the ends of an axle extending from end to end of the sweeper casing.

Fig. 11 is a part transverse section of a carpet sweeper showing a further modified construction of the dust receptacle.

Figure 5:
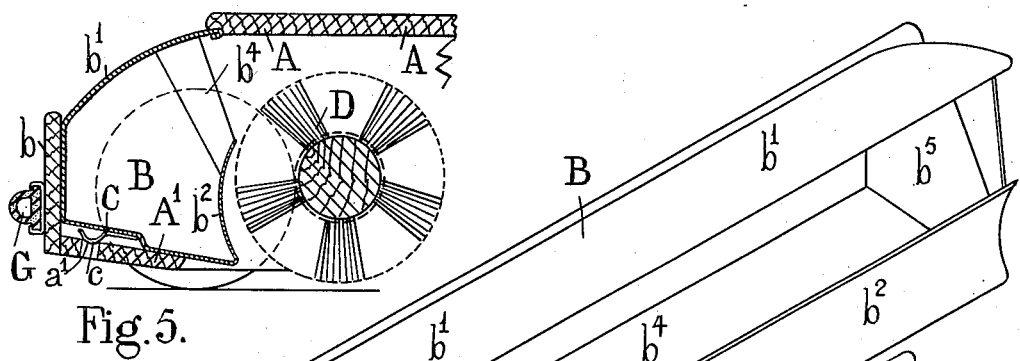
Fig. 5 is a part transverse section of a carpet sweeper showing a modified construction of the dust receptacle.

In all the forms of the invention shown in the drawings each side of the sweeper casing A is provided with a longitudinal aperture or opening extending for the whole or substantially the whole or substantially the whole length of the sweeper through which the dust receptacle B can be inserted and removed, the front $b$ of the dust receptacle B closing the aperture in the casing when the receptacle is in position therein.

The underside of the casing A may be open except for the bottom of the dust receptacles B as in an ordinary carpet sweeper, slides, guides or the like being formed on the inner surfaces of each end to direct and hold the receptacles in position and a spring device may be arranged under the receptacle to exert pressure on the receptacle to prevent it from being accidentally moved when the sweeper is in use.

In order to stiffen the casing A it is preferred to form the bottom thereof with longitudinal stays $A^1$ as shown in the drawings, these stays $A^1$ forming the supports on which the receptacles B rest when in position in the casing and serve as guides when the receptacles are being inserted and removed. A spring device C provided with a domed or tapered portion $c$ is affixed to the underside of the dust receptacle B the portion $c$ being located in a hole or recess $a^1$ in the stays $A^1$ when the receptacle is in its operative position to prevent the receptacle from being accidentally removed from the casing.

The front $b$ of the receptacle B forms a portion of the side of the casing A as shown in Figs.

Figure 8:
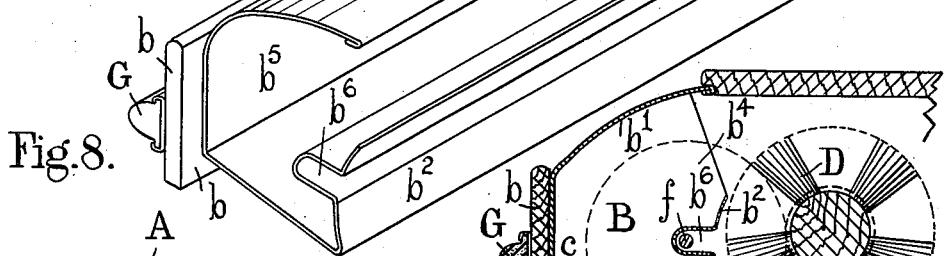
Fig. 8 is a perspective view of the dust receptacle shown in Fig. 7 for use in a carpet sweeper having each pair of traction wheels at either side of the brush carried at the ends of an axle extending from end to end of the sweeper casing.
Figure 9:
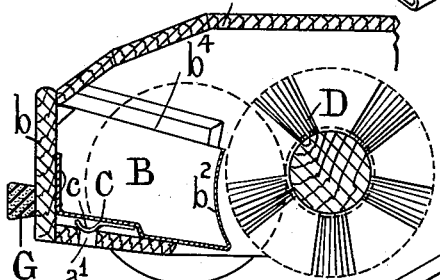
Fig. 9 is a part transverse section of a carpet sweeper showing a further modified construction of the dust receptacle.
Figure 7:
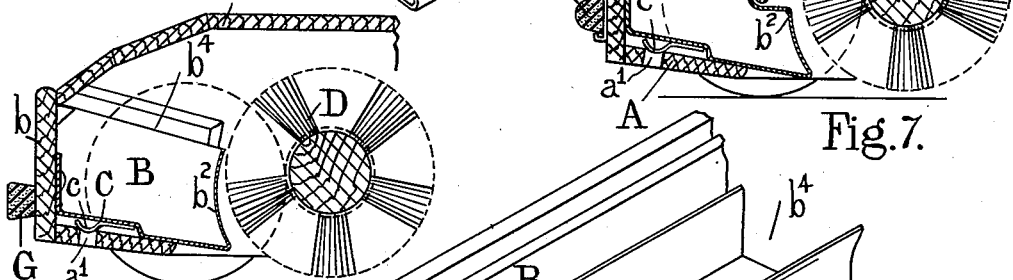
Fig. 7 is a part transverse section of a carpet sweeper showing a further modified construction of the dust receptacle.
Figure 10:
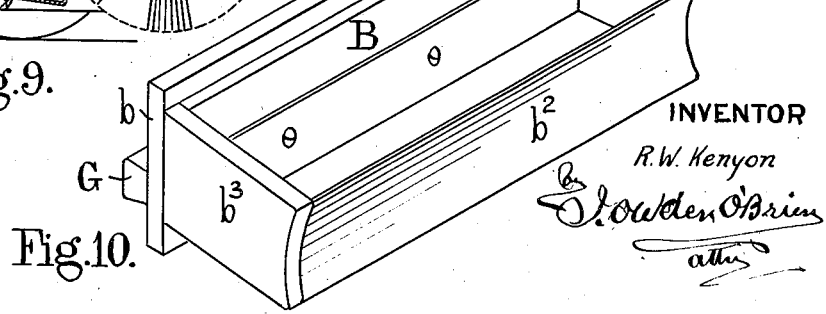
Fig. 10 is a perspective view of the dust receptacle shown in Fig. 9 for use in a carpet sweeper having each traction wheel carried by an independent stub axle.

1, 2, 3 and 4, Figs. 9 and 10 and Fig. 11 and the top $b^1$ of the receptacle B may extend upwards to the top A of the casing as shown in Figs. 5 and 6 and Figs. 7 and 8 of the drawings.

The inner wall $b^2$ of the dust receptacle B adjacent to the brush D is curved. The wall $b^2$ may be concentric with the brush D as shown in Fig. 11 but it is preferred to make the curvature thereof such that it is nearer to the brush at the top than at the bottom shown in Figs. 2, 5, 7 and 9 thereby forming a curved path between the wall $b$ and the brush D for the dust and litter swept up by the brush which path decreases in width from bottom to top. The upper edge of the wall $b^2$ preferably is in contact or almost in contact with the periphery of the brush. The top of the wall $b^2$ may terminate below, at or above a horizontal plane through the axis of the brush D.

Figure 6:
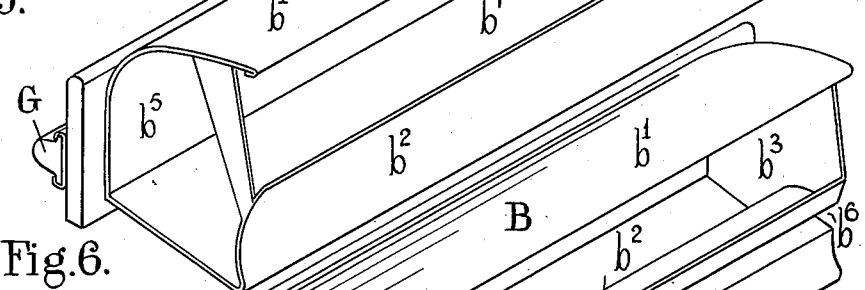
Fig. 6 is a perspective view of the dust receptacle shown in Fig. 5 for use in a carpet sweeper having each traction wheel carried by an independent stub axle.

The two ends $b^3$ of the receptacle B may be closed as shown in Figs. 3 and 4, in which case the dust and litter is discharged from the receptacle when removed from the sweeper casing through the opening $b^4$ by which it enters. Alternatively the receptacle may be open at one end $b^5$ and closed at the other end $b^3$ as shown in Fig. 8 or it may be open at both ends $b^5$ as shown in Fig. 6 to enable the dust and litter to be discharged from the receptacle through an open end by moving the receptacle into a vertical or substantially vertical position after removal from the sweeper casing. The construction of the dust receptacle open at one or both ends is advantageous when the aperture $b^4$ through which the dust and litter enters the receptacle is of less width than the width of the receptacle.

The receptacle is particularly applicable for use in a carpet sweeper having each of the track wheels mounted on an independent stub axle as such allows of the inner wall $b^2$ being formed as a continuous curve as shown in Figs. 2 and 3, Figs. 5 and 6, Figs. 9 and 10 and Fig. 11. It can however also be employed in a sweeper casing having the usual track wheel axle $f$ extending through the casing from end to end thereof by forming a slot $b^6$ in the curved inner wall $b^2$ to house the axle $f$.

A furniture guard G preferably extends along the front $b$ of each receptacle B at the same level as the furniture guard $C^1$ at the ends thereof whereby when the receptacle is in position the ends of the guard on the receptacle will abut or approximately abut against the guard on the ends of the casing so forming a complete guard around the sweeper.

The furniture guard G on the front of the receptacle may be shaped for a whole or part of its length as a handle or grip by which the receptacle can be pulled out of the casing.

What I claim as my invention and desire to protect by Letters Patent is:

In a carpet sweeper of the type having a casing, four supporting wheels, a central brush and two dust receptacles one at each side of the central brush, a dust receptacle adapted to be entirely removable from the casing in a horizontal or substantially horizontal direction through an aperture in the side wall thereof comprising in combination a base supported by the bottom of the casing, a front wall which when the receptacle is in position in the casing closes the aperture therein, a curved rear wall adjacent to the brush provided with a deep recess open at the rear and extending from end to end of the receptacle to receive an axle connecting a pair of the supporting wheels at opposite ends of the casing when the receptacle is in position in the latter and so allow the rear wall to be brought into close proximity to the brush and spring means for retaining the receptacle in position in the casing.

RICHARD WALTON KENYON.